United States Patent [19]
Wood et al.

[11] Patent Number: 5,959,816
[45] Date of Patent: Sep. 28, 1999

[54] VOLTAGE REGULATOR CIRCUIT

[75] Inventors: Gary Wood, Huntington Beach; Bernard Feldman, Laguna Hills, both of Calif.

[73] Assignee: Anthony, Inc., San Fernando, Calif.

[21] Appl. No.: 08/804,882

[22] Filed: Feb. 24, 1997

Related U.S. Application Data

[63] Continuation of application No. 08/126,804, Sep. 24, 1993, abandoned.

[51] Int. Cl.$^6$ ........................................................ H02H 7/00
[52] U.S. Cl. ............................... 361/18; 361/57; 361/94; 361/104; 361/86
[58] Field of Search ................................. 361/93–94, 98, 361/100–101, 103–104, 113, 86, 54–57, 18; 323/274–278, 284–286

[56] References Cited

U.S. PATENT DOCUMENTS

| | | | |
|---|---|---|---|
| 3,727,105 | 4/1973 | Hochheiser | 361/55 |
| 3,819,986 | 6/1974 | Fukuoka | 361/56 |
| 3,941,975 | 3/1976 | Newman et al. | 219/509 |
| 3,982,173 | 9/1976 | Berry et al. | 323/17 |
| 4,012,669 | 3/1977 | Gelfand et al. | 361/97 |
| 4,127,765 | 11/1978 | Heaney | 219/218 |
| 4,248,015 | 2/1981 | Stromquist et al. | 49/70 |
| 4,260,876 | 4/1981 | Hochheiser | 219/497 |
| 4,280,161 | 7/1981 | Kuhn et al. | 361/18 |
| 4,544,980 | 10/1985 | Serrie et al. | 361/45 |
| 4,618,906 | 10/1986 | Paice et al. | 361/5 |
| 4,671,582 | 6/1987 | Stromquist et al. | 439/31 |
| 5,097,379 | 3/1992 | Walton et al. | 361/92 |
| 5,144,517 | 9/1992 | Wieth | 361/55 |

*Primary Examiner*—Michael Sherry
*Attorney, Agent, or Firm*—Henricks, Slavin & Holmes, LLP

[57] ABSTRACT

A voltage regulator circuit includes a circuit input and a circuit output for coupling to a load. A circuit interrupt element is coupled between the input and the load for breaking the circuit between the input and the load. A sensing circuit coupled to the output senses when a signal applied to the load exceeds a defined limit. A trigger circuit coupled to the sensing circuit causes the circuit interrupt element to trip when the sensing circuit senses a signal which exceeds the defined limit.

30 Claims, 2 Drawing Sheets

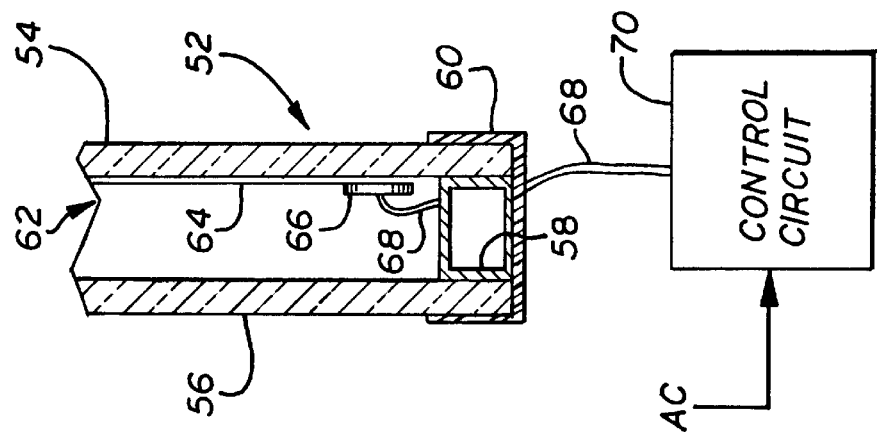
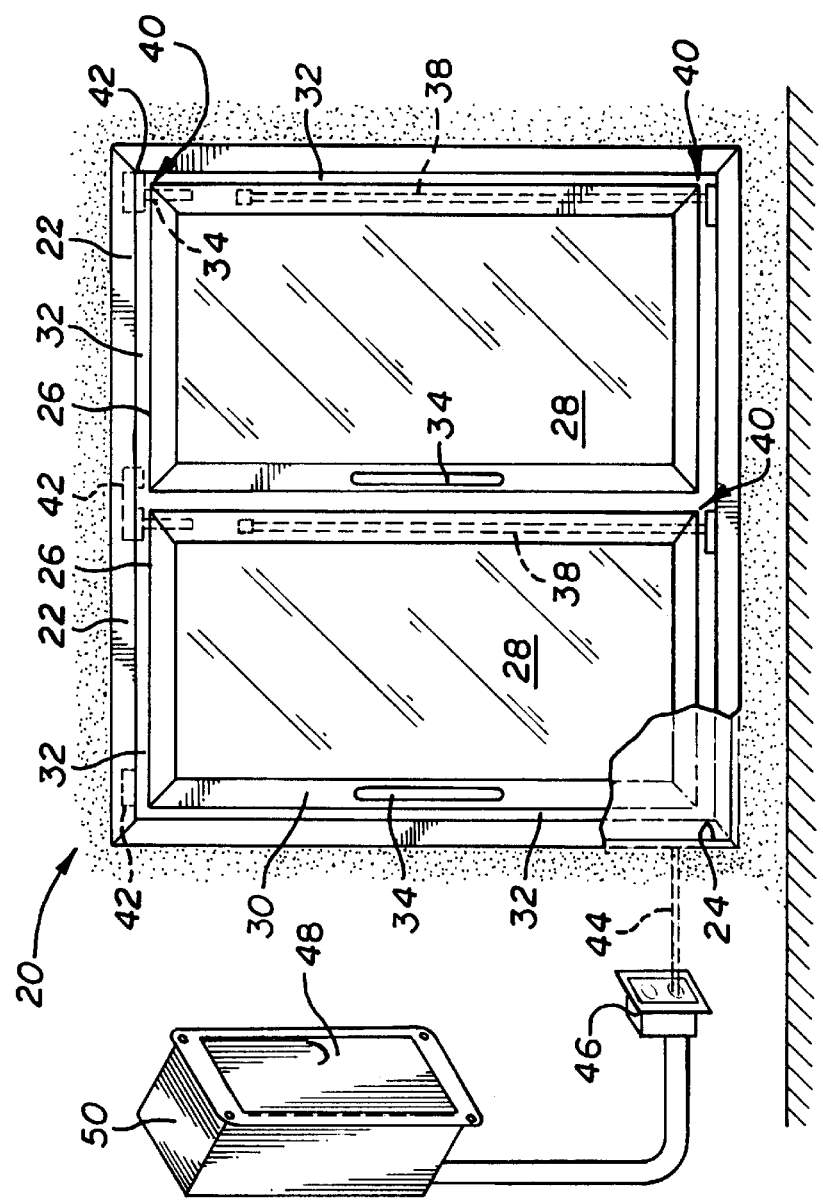

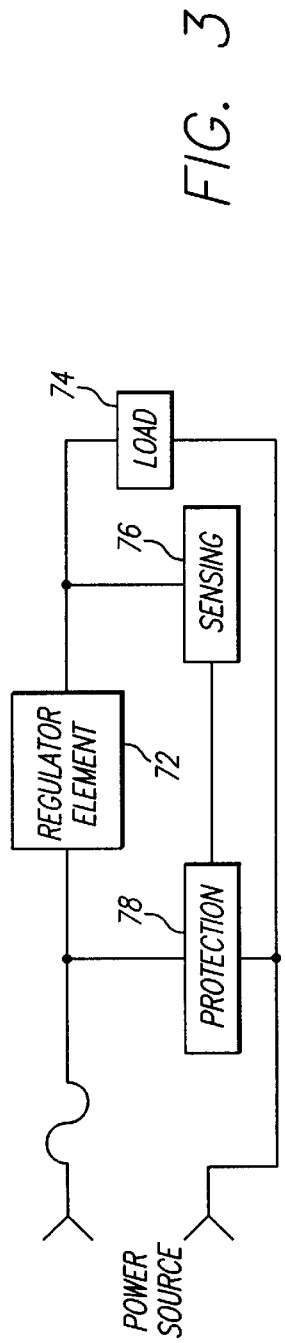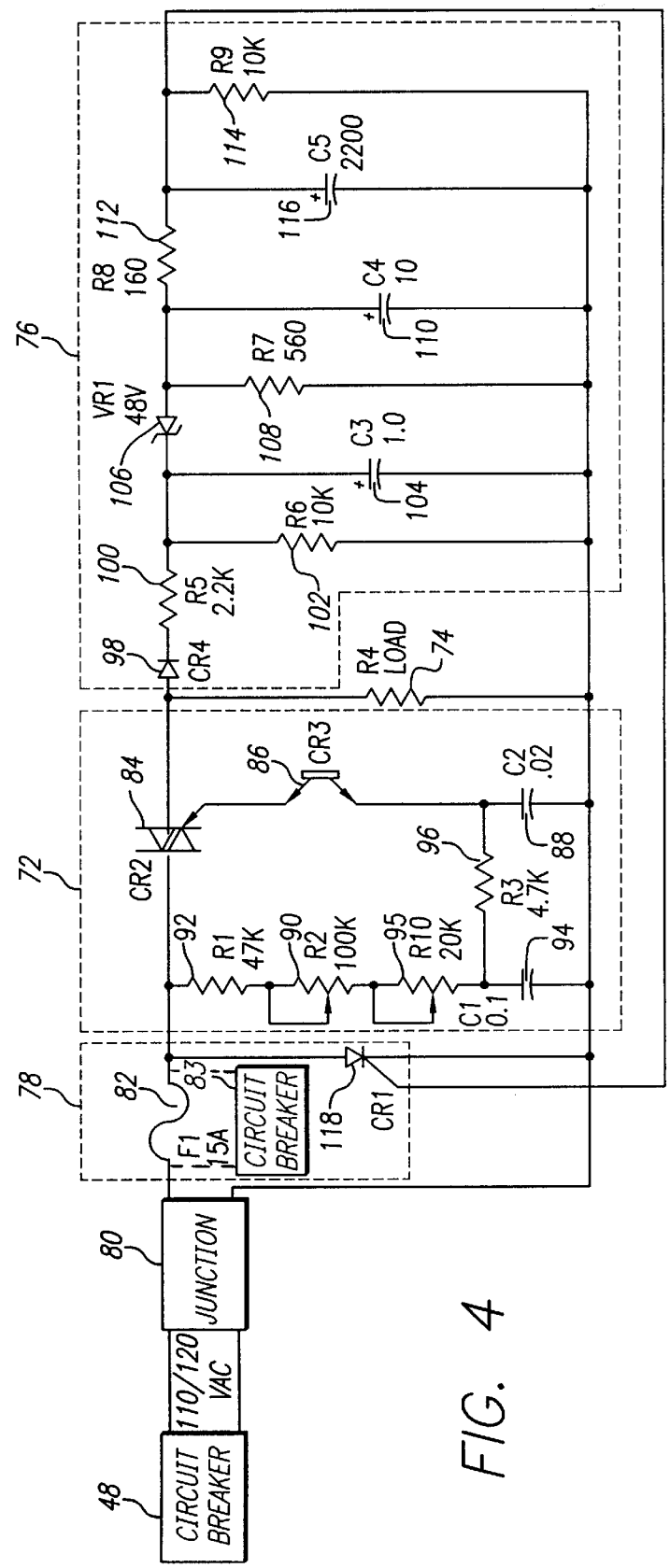
FIG. 3
FIG. 4

VOLTAGE REGULATOR CIRCUIT

CROSS-REFERENCE TO RELATED APPLICATION

This application is related to U.S. patent application Ser. No. 08/126,804, filed on Sep. 24, 1993, entitled "VOLTAGE REGULATOR CIRCUIT" by Wood et al, now abandoned.

BACKGROUND OF THE INVENTION

1. Field of the Invention

The present invention relates to an electrical signal regulator circuit, such as a voltage-regulator circuit, for example, or a regulator circuit for a glass unit to protect the glass unit from damage.

2. Related Art

Glass units may be heated to reduce fogging, condensation or other accumulation of moisture. They may also be heated after the glass has become fogged in order to eliminate any accumulated condensation. Glass units such as those for refrigeration units in commercial establishments, such as grocery stores and convenience markets, are often heated to minimize any fogging or condensation of ambient humidity.

Refrigerator doors, for example, are commonly coated with a resistive material to which is applied a voltage to heat the material and thereby the glass, reducing or eliminating any condensate, or the potential for moisture to condense on the glass. These coatings are sometimes referred to as transparent conductors, and are applied to one surface of the glass. The transparent conductor has an inherent fixed resistivity, and the resistance of a given coating depends on the bulk resistivity and thickness of the coating and the size of the glass on which the coating is placed. The amount of heat produced in the coating for a given glass unit then depends on the applied voltage which, in accordance with conventional applications is most conveniently and economically the line voltage available from the electric utility. In the United States, the line voltage is 120 volts while the line voltage in Europe is 220/240 volts. Therefore, glass doors or other glass units to be used in the United States are coupled to control circuits designed for operation at 120 volts. Units to be used in Europe use control circuits designed for 220/240 volts. Considering glass units for the United States, then, the heating of such glass units depends on the door or glass size and the bulk resistivity and thickness of the coating as to how much the glass is to be heated. Thus, for a given environment, a larger door will have a different thickness to achieve the necessary heat production than a smaller door, for the conventional line voltage. For a given size door, a glass unit used in a humid area would require more heat to avoid fogging than would a glass unit used in an arid area. Therefore, a glass unit for a humid area optimally should be coated with less material than one for an arid area. In practice however, a coating typically is applied to a glass unit so that the glass unit can be used in any area, regardless of the humidity and ambient temperature.

The relationship between the door size, resistivity and voltage derives from the bulk resistivity of the material and the thickness of the material applied to the door, which translates into a resistance per square, wherein the area is a dimensionless quantity. The voltage to be used is derived from the power equation $P = I^2 \times R$, wherein "P" is the power, "I" the current and "R" the resistance, the latter being determined by the size of the door, assuming a predetermined resistance per square. The voltage V will then be the square root of the product of "P" and "R".

Glass units can now be produced economically with a uniform thickness of a given transparent conductor (i.e., a standard resistance per square), giving rise to the need for a means for applying the proper voltage to a glass unit for a given unit size, and also preferably as a function of the surrounding environment. There is a need for a reliable, low-cost, and predictable method of applying voltage to the transparent conductive coating on such glass units in a known amount and character.

SUMMARY OF THE INVENTION

The present invention provides a voltage regulator circuit for controlling voltage or current applied to an element such as a transparent conductive coating. The circuit can be used to apply a voltage signal of a known value to the transparent conductor, regardless of the unit size, the number of panes in the glass unit, the environment in which the unit is to be used, and the like. The circuit is reliable, inexpensive to incorporate into an assembly of refrigerator and/or freezer doors, for example, and can be modified to provide additional protections. In accordance with one aspect of the present invention, the regulator circuit includes an input, an output for coupling to a load, such as a coating on a glass unit, and a circuit control element for modifying the signal applied to the load. A sensing circuit senses when a signal applied to the load exceeds a defined limit, such as might occur to cause overheating of the glass.

In another form of the invention, a glass unit, such as for a refrigeration unit, includes a material associated with the glass unit to which a voltage or a current is applied. A regulator circuit is used with the glass unit and includes a circuit control element for modifying the signal applied to the material. A sensing circuit senses when the voltage or current applied to the output exceeds a defined limit and triggers the circuit control element when it exceeds the limit. In the context of a glass unit, such a regulator circuit will minimize the possibility that the glass unit will overheat, break or otherwise be damaged in the event of undesired signals coming from the input. In one form of the invention, the circuit control is an interrupt, such as a fuse which will serve to disconnect the line voltage from the load. In another form of the invention, a trigger circuit is included, such as a silicon controlled rectifier (SCR) for causing a fuse in the circuit to open. Alternatively or in addition, the SCR is designed to cause a main circuit breaker, such as in a utility panel, to trip before any damage can be caused to the glass unit even if the fuse is bypassed.

In another form of the invention, a voltage control device is used to control the amount of voltage applied to the transparent conductive coating to be less than the line voltage at the input. For example, the voltage control device may be a triac or other similar device to apply only a portion of an AC signal to the conductive coating on the glass. A triac will reduce the average voltage applied to the glass unit. The control circuit preferably further includes an element, such as a diac, for optimizing the performance of the voltage control device.

In a further form of the present invention, a control circuit, such as for applying voltage to conductive coatings on a glass unit, includes a filter or integrating circuit for ignoring or minimizing the effects on the circuit of short-term transients, such as current spikes and the like, which may arise from the starting or stopping of refrigeration units or other equipment for example. The integrating circuit determines the net power which would be applied to the coating over a given period of time to determine if the power exceeds a given level.

It is therefore an object of the present invention to provide a circuit which controls the signal applied to a load, such as a glass unit.

It is a further object of the present invention to provide a regulator circuit which minimizes the possibility of damage or other adverse effects on glass units which may result from possible failures of circuit elements.

It is an additional object of the present invention to provide an inexpensive and reliable regulator circuit for such applications as transparent conductive coatings on glass units.

It is a further object of the present invention to provide such a circuit which accounts for transients, which minimizes the possibility of damage due to faulty or improper circuit repairs, bypasses and the like.

These and other objects of the present invention will become more apparent after considering the following brief description of the drawings and detailed description of the preferred embodiments.

BRIEF DESCRIPTION OF THE DRAWINGS

FIG. 1 is a front elevation view of a glass unit installed in a refrigeration unit, according to one application of the present invention.

FIG. 2 is a cross-sectional view of a glass unit having a transparent conductive coating, constituting one form of an application for the present invention.

FIG. 3 is a schematic block diagram, representing one preferred form of the present invention.

FIG. 4 is a circuit diagram, representing a preferred form of one aspect of the present invention.

DETAILED DESCRIPTION OF THE PREFERRED EMBODIMENTS

In accordance with the present invention, a voltage regulator circuit is provided for controlling voltage or current applied to an element or load, such as a transparent conductive coating on part of a glass unit, such as may be used in a commercial refrigerator glass door. The circuit may be a separate discrete unit or may be incorporated as an integral part of an assembly, such as part of a refrigeration unit. In the examples given herein, the circuit will be described in conjunction with the controlled heating of a glass unit and the protection of the glass unit to prevent breakage or damage to the unit, though other applications are possible.

A refrigerated display case 20 such as is typically found in markets, liquor stores, convenience stores and the like, may be fabricated on a custom or a semi-custom basis in which a refrigeration case 22 is incorporated into an opening 24 of a cabinet or the like. The refrigerated display case 20 is maintained at a lower temperature than ambient by conventional refrigeration equipment (not shown) in order to preserve food-stuffs and the like. The display case 20 may include one or more hinged doors 26 for viewing and allowing access to the items within the case, two right-hand opening doors being illustrated in FIG. 1. Each door 26 includes glazed viewing areas 28 by including one or more glass panes within door frames 30. Numerous door constructions are well known in the refrigerator and freezer area.

The doors are supported by and close over surrounding frames 32 defining an opening into the refrigerated case. Doors 26 typically include handles 34, and, in the case of a vertical swing door, hinges 36 at the top corner of a vertical or hinged side of the door for swinging outward from the display case. The lower portion of the hinged side of each door typically includes an automatic door closing mechanism 38 having one portion fixed to the surrounding frame at 40. The top hinge assembly includes a mounting gib and electrical connector 42 for mounting a plug-in hinge pin having a mating electrical connector for mounting in the gib at the top of a respective door to the top of a surrounding frame. Such an assembly is shown and described in U.S. Pat. No. 4,671,582, the disclosure of which is incorporated herein by reference. The electrical connector 38 passes current at a pre-determined voltage to circuits in the door for heating the door frame as well as heating one or more panes in the glass unit. An alternating current (AC) signal is provided through an appropriate cable 44 from a connection 46 receiving power from a utility source through a circuit breaker 48 in a main junction box 50.

Refrigerator doors for commercial refrigerator display cases typically include a glass unit 52 (FIG. 2) having one or more glass panes such as a forward glass pane 54 exposed to the ambient air and a rearward glass pane 56 exposed to the interior of the refrigerator display case. A spacer 58 separates the glass panels and a glazing strip 60 surrounds the perimeter of the glass unit.

In low temperature and/or high humidity applications, the outer glass pane 54 includes an interior surface 62 having a transparent conductive coating 64 for heating the forward glass panel 54. Current is supplied to the coating 64 at a defined voltage through a bus bar 66 through a circuit 70 for controlling the heating of the conductive coating 64. The circuit 70 may be placed separately in the surrounding frame construction, in a ballast in a surrounding frame or even within the door frame.

In the preferred embodiment, the circuit 70 takes an AC signal from a line power source, such as 120 volts at 60 Hz in the United States (FIG. 3). The AC signal is then applied to a regulator element 72 which then applies the AC signal, modified or unmodified to a load 74. The signal applied to the load 74 is sensed, sampled or tested by a sensing circuit 76 for determining if a signal applied to the load exceeds a defined limit. If the load signal exceeds the defined limit, the signal to the load is modified or interrupted to protect the load, or for any other purpose as desired. In the preferred embodiment, the sensing circuit 76 is coupled to and controls a protection or control circuit 78 for protecting the load and which will interrupt the signal to the load or modify the signal applied to the load in a way or at a time as determined by the sensing circuit 76. Alternatively, the timing or type of the modification or interrupt may be determined by the protection circuit. In the preferred embodiment, the protection circuit 78 is coupled across the input lines from the connection 46 or other input.

The regulator element 72 preferably controls the voltage supplied to the load. In the particular embodiment described herein, the regulator element 72 limits the voltage applied to the coating 64. The preferred or selected voltage will depend on the resistance of the coating, which in turn is determined by the bulk resistivity and the thickness of the coating, and the size of the door, and the voltage applied is also selected based on the ambient environmental conditions in which the door is to be used. The characteristics of the regulator element 72 will also depend on the input line signal. In the preferred embodiment, the regulator element 72 includes a triac for applying a voltage to the load as a function of time, namely during only a certain part of the AC cycle. Triacs are suitable for applying less than the full voltage to the load, and are small enough to be positioned in small areas. Transformers and potentiometers may serve the same function but are relatively large and are not preferred for application inside refrigeration units. A triac provides a controlled voltage signal without creation of a significant amount of heat in the circuit and is an economical substitute to a transformer, for example. In alternative embodiments, the regulator element 72 can apply voltage to the load at reduced levels, or at different levels for different periods of time. The regulator element 72 also preferably includes an adjustment device, such as a potentiometer, for adjusting the regulator element as a function of the particular door to which it is to be connected, as well as the characteristics of the ambient environment.

The sensing element 76 for sensing when a signal applied to the load exceeds a defined limit may sense one or more of the actual voltage level of the signal applied to the load, the frequency with which signals of a given voltage are applied to the load, or the length of time that a particular voltage is applied to the load. Current may also be sensed by the sensing circuit 76. In the particular embodiment described herein, the sensing circuit includes one or more filter circuits for integrating or filtering the signals applied to the load and determining when those signals exceed a given voltage, for example the defined limit. The defined limit typically would not be the preferred voltage applied to the glass unit since some signals slightly higher than the preferred voltage for the glass unit may be passed to the glass unit without any significant adverse effects. For example, because a significant concern with a refrigerator door having a conductive coating is to prevent overheating, the conductive coating can easily accommodate some higher voltage signals such as may exceed the line voltage (such as 200 volts), which may result in a temporary slight increase in door temperature, but a sustained signal of 200 or 400 volts having a pulse width of over several tenths of a second may damage the conductive coating or the door. Such a sustained signal may arise from a utility problem or line problem somewhere else in the building or from failure of the regulator circuit. For example, a 220 or 400 volt line may be inadvertently applied to the circuit to which the door is coupled, or the voltage regulator circuit may start applying the full 110 RMS voltage to the load continuously. Therefore, in the preferred embodiment, the circuit is interrupted only after several excursions are received, or after a sustained excursion is received, to avoid interrupting the circuit after simply a few acceptable or permissible transients are applied to the load. For example, in the embodiment of the present invention described herein, the conductive coating is such that a number of transients exceeding the maximum voltage can be applied to the conductive coating without significant damage, in other words overheating would not occur. However, if a significant number of transients are applied to the conductive coating, or if a continuous level of high voltage is applied to the conductive coating over a period of time, the coating could become damaged or the glass may overheat, which could break the glass or otherwise damage the glass unit.

It should be noted that any electric component is subject to failure and measures can be taken to minimize the possibility of a failure. For example, triacs can fail, and in the embodiment where a triac is used to control the voltage applied to the load, a shunt can be used to protect the triac from spikes or transients.

The protection circuit 78 may be a control circuit which modifies the signal to be applied to the load, but is preferably an interrupt which completely removes all signals from the load when the signal applied to the load exceeds the defined limit. In the preferred embodiment of the present invention, the protection circuit is a current sink or drain which completely eliminates all signals from the load. Preferably, the protection circuit includes a silicon controlled rectifier (SCR) and a fuse or circuit breaker, or both, or some other means by which the signal can be entirely removed from the load or reduced in a known fashion to eliminate any possible harm to the load, such as by overheating the coating, and the like. Other heavy current carrying devices can be used, such as relays and triacs. Alternatively, the protection circuit may be such as to modify the signal to a known constant value or so as to have some other characteristic which preferably eliminates any possibility that an unwanted signal is applied to the load.

A preferred circuit for applying and controlling application of signals to the load is shown in FIG. 4. A suitable signal is applied from the circuit breaker 48 to a suitable junction 80. The positive output of the junction 80 is coupled to an internal fuse 82, having a known rating. In an alternative preferred embodiment, the internal fuse 82 is replaced with a circuit breaker 83. As described more fully below, the fuse preferably has an amperage rating less than that of the SCR so that the fuse will open whenever the SCR conducts. The other side of the fuse is coupled to the regulator circuit 72 which preferably includes a triac 84 controlled by a diac 86, coupled between the control of the triac 84 and neutral through a capacitor 88. The triac applies only a certain portion of the AC signal to the load so that the average voltage applied to the load during normal operation is preferably less than the line voltage. The regulator circuit 72 also includes a potentiometer 90, rated at 100K Ohms, coupled to the input of the triac through a first resistor 92. The potentiometer is coupled to neutral through a capacitor 94. In the preferred embodiment, a second potentiometer 95 is coupled in series with the potentiometer 90 and which is accessible to personnel, such as at the installation site, for adjusting the average voltage applied to the load to accommodate various operating conditions, such as humidity. For example, the potentiometer 95 may be a 20K Ohm potentiometer to provide a ±20% adjustment for the voltage to the load. A resistor 96 has one side coupled between the potentiometer 90 and the capacitor 94, and the opposite side coupled between the diac 86 and the capacitor 88. In the preferred embodiment where the resistor 92 is a 47K Ohm resistor, the potentiometer establishes the threshold voltage at which the triac conducts. The potentiometer and the capacitor 88 set the angle for the AC cycle over which the triac will conduct. Capacitor 94 sets the phase angle for the regulator circuit 72. The diac 86 controls the triac 84 and improves the operation of the triac by sharpening the breakdown of the triac, thereby sharpening the transition from the Off state to the On state for the triac. The regulator circuit may alternatively use a potentiometer, transformer, gate circuits, series connected triacs and the like for applying the desired voltage to the load, but a triac is preferred.

The output of the triac is applied to one side of the load 74, the other side of which is connected to neutral. The output of the triac is also coupled to the input of the sensing circuit 76 through a diode 98, the opposite side of which is coupled through a resistor 100 to several RC filter networks. The first filter network includes parallel-connected first resistor 102 and first capacitor 104. The second side of the resistor 100 is also coupled to Zener diode 106, for setting approximately where the sensing circuit determines that the signal applied to the load exceeds the defined limit. The Zener diode, along with the filter circuits establish the defined limit for the sensing circuit. The voltage is preferably somewhat above 90 volts. The opposite side of the Zener diode 106 is coupled to the second filter network, including a second resistor 108 and second capacitor 110. The second lead of the Zener diode is also coupled to the third filter network through a resistor 112 to the third resistor 114 and the third capacitor 116. The presently preferred values of these components are set forth below. The resistor 112 is also coupled to the gate of an SCR 118 for triggering the SCR when the signal applied to the load exceeds the defined limit.

In the preferred embodiment, the filter networks prevent the sensing circuit from interrupting the circuit to the load in the cases where transients occur over a span of several seconds, but less frequently than 50 or 60 per second or where a transient is sustained for a prolonged period, such as over several tenths of a second. As such, the sensing circuit 76 effectively integrates the voltage applied to the load over time and compares that integrated signal to the defined limit. If the integrated signal exceeds the defined limit, the circuit interrupt or some other function may be triggered. The sensing circuit may also be considered as filtering out and therefore ignoring transients or spikes which may exceed the set voltage less frequently than, for example, 40 per second. The particular events which may cause interruption of the signal to the load will depend on the application. Transients or intermittent signals exceeding the desired parameters for the load may arise from starting and stopping of refrigeration compressors, large motors or other electronic equipment which draw large currents. Typically, transients arising from such conditions are relatively infrequent, relative to line voltage operating at 50 or 60 Hz. Therefore, the values of the circuit elements in the sensing circuit will vary depending upon the load, the circumstances and individual preference.

It should be understood that other integrating functions will also serve the same purpose of protecting the load while at the same time not triggering the interrupt on insignificant transients. For example, the sensing circuit may use a resistance heating element immediately adjacent a thermistor as the sensing/integrating element. The resistance heats up over time with transients but will exceed a limit only if the transient is a sustained spike or occurs too often. A resistance heater/thermistor is an alternative integrating device. Other elements may serve the same function and may also be applicable to the present circuit.

The defined limit for the sensing circuit may be made adjustable by any number of means. For example, a potentiometer may be used in place of or in addition to the resistances at 108 or 112. Additionally, the trip point or threshold for the sensing circuit may be adjustable upward or downward in parallel with upward or downward adjustments in the level of voltage applied to the load. Also, the sensing circuit may have circuit components or values which would allow it to have a two stage filter arrangement rather than three stages, as shown in FIG. 4, and the values of the components in the sensing circuit may vary depending on application.

The protection circuit 78 preferably includes the SCR 118. The SCR 118 is preferably a 600 volt SCR rated at 25 amps. The SCR preferably is suitable for any foreseeable voltage level, and has a rating which is greater than either the fuse 82 or the circuit breaker 48 so that the fuse can open and the circuit breaker can trip under appropriate circumstances. Under circumstances where the sensing circuit 76 indicates a signal or set of signals which exceed the defined limit, the sensing circuit 76 will trigger the SCR through the connection between the resistor 112 and the gate of the SCR 118 so that the SCR conducts, thereby drawing current through the fuse 82 to ground. The maximum current possible will be drawn through the SCR. Therefore, with a 25-amp circuit breaker and a 15-amp fuse, the fuse 82 will open before any further undesirable signals are applied to the load 74. As is apparent, the rating of the SCR is preferably greater than or at least equal to the rating of the circuit breaker 48. In the extraordinary situation where a person attempts to bypass the fuse 82 by directly coupling the regulator circuit 72 to the junction 80, such as by inserting a penny or some other substantial conductor, the SCR 118 will trip the circuit breaker 48 as soon as the SCR begins to conduct as a result of a signal being sensed by the sensing circuit 76 which exceeds the defined limit.

It is economical to make refrigerator doors for low temperature applications by coating them with transparent conductive coatings having a uniform resistivity and thickness, thereby providing a uniform or standard resistance per unit area. For standard doors having typical dimensions and operating in most applications which may be found at the present time, a voltage of less than 110 volts RMS is adequate to prevent fogging of the glass unit. Sustained voltages of about 110 RMS will cause overheating and damage the glass unit. The regulator circuit is then preferably designed so as to apply a lower voltage, on average, to the coating sufficient to inhibit fogging but not so great as to overheat the glass unit. Under current circumstances, utilizing standard transparent conductive coatings of approximately twenty Ohms per square, the average voltage to be applied to the glass unit ranges between 30 and 80 volts.

In the undesirable occurrence that the triac or some other circuit element in the regulator circuit 72 fails to operate or otherwise becomes faulty, two possibilities may occur. In one situation, the regulator circuit will fail to apply any signal to the load 74. In the context of the preferred embodiment of the present invention, failure of the regulator circuit 72 will simply result in failure to heat the glass unit, thereby resulting in fogging of the door unit. However, no voltage is applied to the glass unit and no electrical hazard arises. Fogging of the door will alert personnel to a problem, resulting in an investigation to correct any faulty circuit. In the other instance, the regulator element may fail to modify or reduce the AC signal applied to the load, in which case all of the AC signal is applied to the load 74, ultimately resulting in overheating of the conductive coating 64 and thereby the glass pane 54. As a result, rather than approximately 30 to 80 volts average being applied to the load, 110 volts RMS is applied to the load, at 60 Hz, exceeding the requirements for the glass unit, and also the defined limit for the sensing circuit. The sensing circuit 76 will then detect the higher voltage at the higher than desired level and trigger the SCR to conduct to ground, thereby opening the fuse 82. In both cases, personnel and the doors are protected.

The circuit components are selected so as to produce signals to be applied to the load having a minimum range of 30 to 80 volts average. The Zener diode will then largely determine the absolute value of the threshold voltage which, in part, will cause the sensing circuit 76 to trigger the SCR 118. Preferably, the SCR will provide about 150% current load to force failure of the fuse or the circuit breaker, in appropriate circumstances. The load is then isolated from the power source.

Component values which are presently preferred are as follows:

| Component | Value |
| --- | --- |
| Fuse 82 | 15 Amps |
| Triac 84 | 600 V, 15 amp |
| Diac 86 | Conventional |
| Capacitor 88 | 0.082 microfarads |
| Potentiometer 90 | 100K Ohms |
| Resistor 92 | 47K Ohms |
| Capacitor 94 | 0.1 microfarads |
| Potentiometer 95 | 20K Ohms |
| Resistor 96 | 4.7K Ohms |
| Diode 98 | 600 V, 100 mA |
| Resistor 100 | 2.2K Ohms |
| Resistor 102 | 10K Ohms |
| Capacitor 104 | 1.0 microfarads |
| Zener diode 106 | 48 volts |
| Resistor 108 | 560 ohms |
| Capacitor 110 | 10 microfarads |
| Resistor 114 | 10K Ohms |
| Capacitor 116 | 2200 microfarads |
| SCR 118 | 600 volts, 25 amps |

Although the present invention has been described in detail with reference only to the presently preferred embodiments, it will be appreciated by those of ordinary skill in the art that various modifications can be made without departing from the spirit of the invention. Accordingly, the invention is limited only by the following claims.

We claim:

1. A unit having a regulator circuit, the unit comprising:
a glass unit having at least one glass pane;
a material associated with the glass pane;
a circuit input;
a circuit output for coupling to the material and applying a signal to the material for heating the material;
a circuit control element coupled between the input and the output for controlling the signal applied to the output;
a sensing circuit coupled to the output for sensing a signal applied to the material and integrating the signal for determining if the integration exceeds a defined limit over time; and
a trigger circuit coupled to the sensing circuit for causing the circuit control element to modify the signal applied to the material when the sensing circuit senses a signal which exceeds the defined limit.

2. The unit of claim 1 wherein the sensing circuit includes a filter stage.

3. The unit of claim 1 wherein the circuit control element includes a circuit interrupt element which interrupts the circuit between the input and the material when the trigger circuit activates the control element.

4. The unit of claim 3 wherein the circuit interrupt element is a fuse.

5. The unit of claim 4 wherein the trigger circuit includes a gate element for passing substantially all the current from the input to a ground.

6. The unit of claim 5 wherein the gate element includes a silicon controlled rectifier.

7. The unit of claim 1 wherein the input is a line input and wherein the circuit control element includes a main circuit breaker coupled to the line input.

8. The unit of claim 1 wherein the sensing circuit further includes a zener diode.

9. The unit of claim 1 wherein the trigger circuit includes a silicon controlled rectifier (SCR).

10. The unit of claim 9 wherein the SCR is rated at about 600 volts.

11. A unit comprising:
a glass unit;
a material associated with the glass unit to which a voltage is applied;
a supply circuit having an input and an output, wherein the output is coupled to the material; and
a regulator circuit coupled between the input and the output and including
a circuit control element coupled between the input and the output for controlling the signal applied to the output,
a sensing circuit coupled to the output for sensing when a signal applied to the output and through the material exceeds a defined limit, and
a trigger circuit coupled to the sensing circuit for causing the circuit control element to modify the circuit between the input and the material when the sensing circuit senses a signal through the material which exceeds the defined limit.

12. The glass unit of claim 11 wherein the sensing circuit includes means for discriminating between signals which apply a net power to the material lower than a defined limit and signals which apply a power greater than a defined limit.

13. The unit of claim 12 wherein the discriminating means includes an integrating circuit with at least two filter stages for integrating the signal applied to the material.

14. The unit of claim 12 wherein the discriminating means further includes means for setting a threshold level for the net power to be provided to the material.

15. The unit of claim 14 wherein the threshold setting means includes means for setting a threshold voltage level.

16. The unit of claim 15 wherein the voltage level setting means includes a zener diode.

17. The unit of claim 15 wherein the threshold setting means includes at least one filter stage.

18. The unit of claim 11 wherein the material is a transparent conductive coating.

19. The unit of claim 11 wherein the glass unit is a multiple pane glass unit.

20. The unit of claim 11 wherein the circuit control element includes a circuit interrupt element which interrupts the circuit between the input and the material when the trigger circuit activates the control element.

21. The unit of claim 20 wherein the circuit interrupt element is a fuse.

22. The unit of claim 21 wherein the trigger circuit includes a gate element for passing substantially all the current from the input to a ground.

23. The unit of claim 22 wherein the gate element includes a silicon controlled rectifier.

24. The unit of claim 11 wherein the input is a line input and wherein the circuit control element is a main circuit breaker coupled to the line input.

25. A refrigeration unit comprising:
a glass unit;
a conductive coating on the glass unit to which a voltage is applied;
a supply circuit having an input and an output, wherein the output is coupled to the coating; and
a regulator circuit coupled between the input and the output and including
a circuit control element coupled between the input and the output for controlling the signal applied to the output,
a sensing circuit coupled to the output for sensing when a signal applied to the output and through the coating exceeds a defined limit, and a trigger circuit coupled to the sensing circuit for causing the circuit control element to modify the signal applied to the coating when the sensing circuit senses a signal through the coating which exceeds the defined limit.

26. The unit of claim 25 wherein the regulator circuit further comprises a triac for regulating the signal applied to the coating during normal operation and wherein the sensing circuit includes means for determining a failure of the triac.

27. The unit of claim 26 wherein the regulator circuit further includes a diac for optimizing the operation of the triac.

28. The unit of claim 25 wherein the regulator circuit includes means for adjusting the level of the signal applied to the coating.

29. The unit of claim 28 wherein the adjusting means includes a potentiometer.

30. The unit of claim 25 wherein the trigger circuit includes a silicon controlled rectifier and the sensing circuit includes at least a two stage filter circuit.

* * * * *